United States Patent [19]

Schroeder et al.

[11] 4,290,799

[45] Sep. 22, 1981

[54] FERROMAGNETIC METAL PIGMENT ESSENTIALLY CONSISTING OF IRON AND A PROCESS FOR ITS PRODUCTION

[75] Inventors: Gerhard Schroeder; Gunter Buxbaum; Franz Hund; Heinrich-Christian Schopper; Rolf Naumann, all of Krefeld, Fed. Rep. of Germany

[73] Assignee: Bayer Aktiengesellschaft, Leverkusen, Fed. Rep. of Germany

[21] Appl. No.: 124,399

[22] Filed: Feb. 25, 1980

[30] Foreign Application Priority Data

Mar. 10, 1979 [DE] Fed. Rep. of Germany ....... 2909480

[51] Int. Cl.³ ................................................ B22F 1/00
[52] U.S. Cl. .................................... 75/0.5 A; 75/251
[58] Field of Search ................ 75/0.5 BA, 0.5 A, 251; 148/105

[56] References Cited

U.S. PATENT DOCUMENTS

| | | | |
|---|---|---|---|
| 3,837,839 | 9/1974 | Rau | 75/0.5 BA |
| 3,910,785 | 10/1975 | Greene | 75/0.5 BA |
| 4,133,676 | 1/1979 | Oshimura | 148/105 |
| 4,133,677 | 1/1979 | Matsui | 148/105 |
| 4,165,232 | 8/1979 | Jaeckh | 148/105 |

*Primary Examiner*—P. D. Rosenberg
*Attorney, Agent, or Firm*—Sprung, Felfe, Horn, Lynch & Kramer

[57] ABSTRACT

A metal powder, suitable for magnetic recording, consisting essentially of iron, the individual particles being acicular and containing on average no more then 5 pores and consisting on average of no more than 2 metal cores is produced by precipitating and oxidizing an aqueous iron-(II)-salt solution to produce finely divided acicular iron-(III)-oxide-hydroxide, stabilizing it as by treatment with cadmium, lead, calcium, magnesium, zinc, aluminum, chromium, tungsten, a phosphorus oxide and/or a boron oxide, converting it into ferromagnetic iron oxide of low pore content, and reducing it to metallic iron with a gaseous reducing agent at about 300° to 600° C.

13 Claims, 3 Drawing Figures

FERROMAGNETIC METAL PIGMENT ESSENTIALLY CONSISTING OF IRON AND A PROCESS FOR ITS PRODUCTION

This invention relates to a ferromagnetic metal pigment for magnetic recording purposes which consists essentially of iron and which is distinguished by well-developed acicular particles and superior properties as a recording support, and to a process for the production of this material.

The general aim in the development of new magnetic materials for recording purposes is to achieve much higher storage densities. This may be done by using materials characterized by a relatively high coercive force and saturation magnetization. The development of the theoretically ideal thin-layer metal tape has not yet been successful on account of the failure to overcome production difficulties, particularly mechanical properties, surface quality and corrosion problems. Some of the difficulties can be overcome by using suitable metallic pigments without, at the same time, having to forego the major advantage over oxidic materials of the higher energy product.

Several processes for the production of magnetic metal pigments are described in the literature, the most important of which may be divided into four groups, namely:

- the electrolytic deposition of metal powders from the corresponding salt solution on a mercury cathode (for example, U.S. Pat. Nos. 2,974,104 and 2,988,466);
- the production of metal powders by thermal decomposition of the corresponding metal carbonyls (optionally in a magnetic field to obtain anisometric particles), for example U.S. Pat. No. 2,597,701 and British Pat. No. 695,925;
- the production of metal powders from solutions of the corresponding metal ions by reduction with an also dissolved reducing agent, such as boronate, hypophosphite, etc. (optionally in a magnetic field to obtain anisometric particles), for example U.S. Pat. Nos. 3,206,338 and 3,607,218; and
- the production of metal powders from the corresponding oxides, oxide hydroxides, oxalates, formates, etc. by reduction with gaseous reducing agents (normally hydrogen) at temperatures above 250° C. (for example U.S. Pat. Nos. 2,879,154 and 290,246).

This last mentioned process enable the particle shape and size and their distribution to be influenced within certain limits by choice or formation of adequate starting compounds, particularly the oxides and oxide hydroxides.

In general, metal powders produced from oxides such as these show little uniformity in regard to particle shape and size. In addition, the metal particles obtained, known as "metal needles", are very considerably dissociated into individual "metal cores". Both of these features have an adverse effect upon the magnetic and electroacoustic properties. The break-up of the compact needle form is attributable to the high contraction in volume which, starting for example from acicular $\alpha$-FeOOH up to the metal, amounts to approximately 60%. Approximately half the contraction in volume actually occurs during dehydration of the $\alpha$-FeOOH to $\alpha$-Fe$_2$O$_3$ and subsequent reduction to Fe$_3$O$_4$, so that even these oxidic intermediate products accumulate in highly porous form.

The coercive force and remanence of magnetic particles are known to be governed to a large extent by the particle geometry (Kneller, Ferromagnetismus, Chapters 19, 27 and 28, Springer-Verlag, Berlin, 1962). The coercive force ($I^HC$) in particular may be basically determined in advance by the choice of the particle size of the anisometric precursor compound, for example $\alpha$-FeOOH, $\beta$-FeOOH or $\gamma$FeOOH. In practice, however, any attempt to reach, for example, the coercive force of the metal particles by adjusting the crystallite size of $\alpha$-FeOOH encounters difficulties, particularly when, starting for example from very fine $\alpha$-FeOOH, high coercive forces are to be produced on the iron without doping with cobalt. The considerable dissociation of the particles obtained by known processes is also reflected in a low quotient of remanence and saturation magnetization ($B_R/B_S$) of less than 0.5.

Accordingly, the present invention provides a metal powder consisting essentially of iron for magnetic signal recording, the acicular individual particles containing on average no more than 5 pores and consisting on average of no more than 2 metal cores.

Preferred metal powders according to the invention consist of acicular individual particles characterized a coherent, non-dissociated external needle form, each individual particle containing on average no more than one pore.

The invention is further illustrated in the accompanying drawings wherein.

Figure 3:
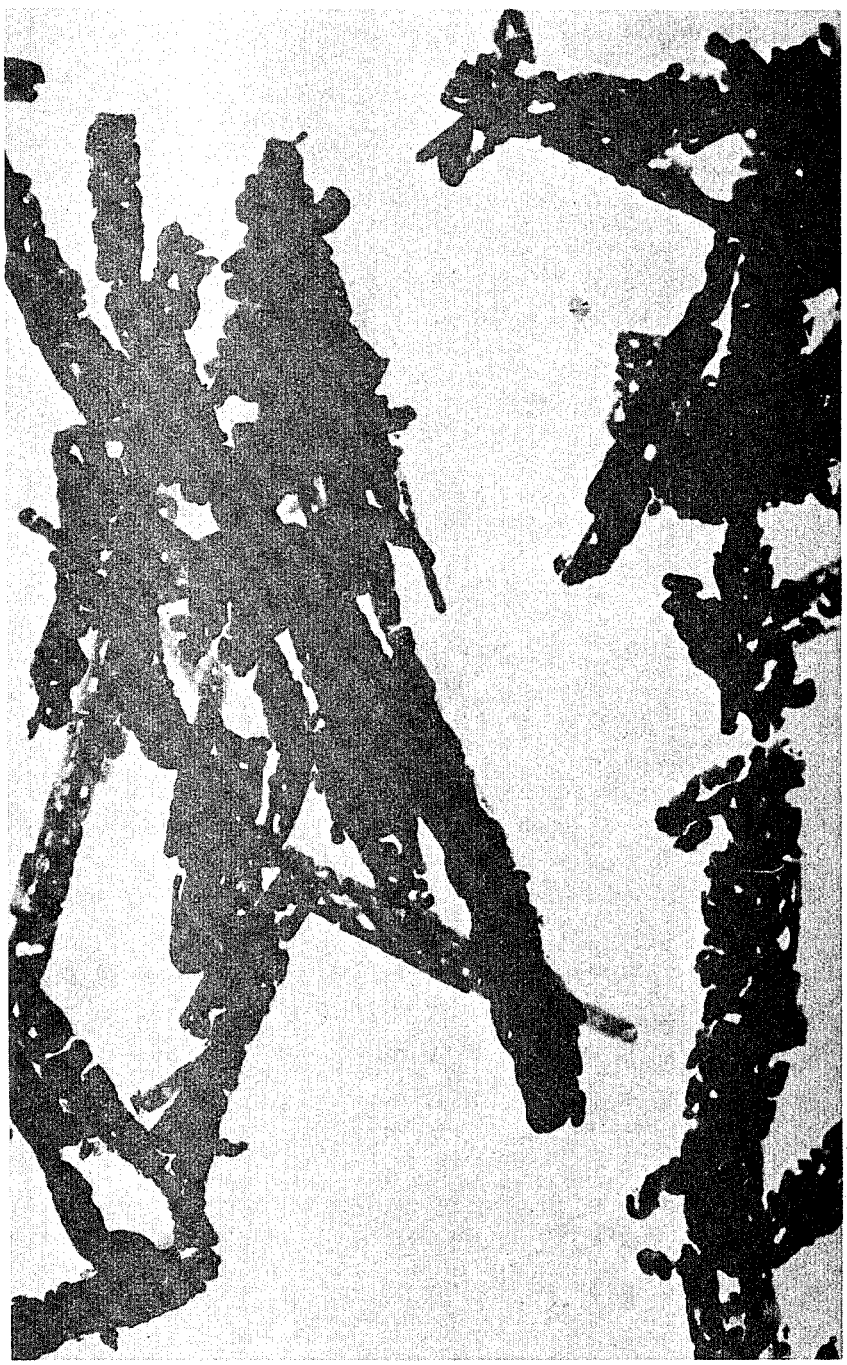

FIG. 3 also shows needles according to the prior art in which the dissociation is lower commensurate with a degree of reduction of only 80 to 90%.

In the context of the invention, a metal core is understood to be a geometric sub-region of an acicular particle which is formed by the merging of several individual pores which are thus no longer separated by matter. Needles dissociated into metal cores are formed, for example, when the metal needles are produced from acicular $\alpha$-Fe$_2$O$_3$ by reduction, as a result of the fact that, dependent on the decrease in crystal volume during reduction, the pores increase in volume so that they ultimately overlap. The expression "chain of spheres" is known from the literature for structures which have a similar appearance in photographs taken through a microscope. However, these structures are formed by agglomeration or growth of individual metal particles. The individual "spheres" consist predominantly of differently oriented crystallographic regions. By contrast, the expression "metal core" as used herein is intended to designate a structure which may be imagined to have been formed from originally coherent material, the various metal cores of a needle having substantially the same crystallographic orientation.

In the context of this definition, the needles according to the invention, in contrast to the prior art needles, consist on average of at most two metal cores and preferably of only a single metal core. The preferred metal powders contain on average no more than one pore per individual particle.

The length of the individual needles determined by electronmicroscopic photographs amounts to between about 0.1 and $2\mu$ and preferably to between about 0.3 and $1\mu$. The diameter of the needles amounts to between about 0.02 and 0.15° and preferably to between about 0.03 and $0.1\mu$, the length-to-diameter ratio being between about 5 and 20.

The metal powders according to the invention preferably have coercive forces of about 750 to 1300 Oe or higher. Considerably higher coercive forces may be obtained if the metal powders consisting essentially of iron contain cobalt. Particularly preferred metal powders according to the invention have coercive forces of about 900 to 1200 Oe, a range which is currently being explored for technical application by the development of suitable recording and playback heads for high-quality audio and video tapes.

Preferred metal powders contain about 0.1 to 7% by weight of at least one of the elements cadmium, lead, calcium, zinc, magnesium, aluminum, chromium, tungsten, phosphorus (expressed as $P_2O_5$) and/or boron (expressed as $B_2O_3$). Particularly preferred metal powders contain about 0.1 to 4% by weight of $P_2O_5$ and/or a quantity of zinc within the same range.

The metal powders according to the invention are further distinguished by a superior squareness ratio as characterized by a ratio $B_r/4 I_s$ of greater than about 0.55 and preferably greater than about 0.6 for a field of 3500 Oe.

The present invention also provides a process for producing the metal powders according to the invention in which finely divided acicular iron(III)-oxide-hydroxide obtained by precipitation and oxidation from aqueous iron (II) salt solutions is dehydrated and reduced to metal, characterized in that the iron-(III)-oxide-hydroxide is initially converted into ferrimagnetic iron oxide containing few pores and structurally stabilized as such, followed by reduction to the metal with a gaseous reducing agent at temperatures in the range of about 300° to 600° C.

The iron(III) oxide hydroxide may be produced in conventional manner. The iron-oxide-hydroxide is preferably protected against sintering during subsequent heat treatments by treatment with inorganic compounds. The treatment may be carried out by the simultaneous precipitation of ions, for example of cadmium, lead, magnesium, calcium, zinc, aluminum, chromium and/or tungsten and/or of $B_2O_3$ or $P_2O_5$. The ions are introduced into the precipitation suspension as water-soluble compounds, preferably of the mineral acids, for example salts of sulphuric acid. Quantities of about 0.1 to 7% by weight of the treatment substances, based on the iron, are sufficient. The treatment may also be carried out after precipitation of the iron oxide hydroxide by precipitation onto the FeOOH-particles. In this case, precipitation onto the FeOOH-particles should take place in the precipitation suspension. Zinc-and/or phosphate-ions are preferably used.

Precipitation and oxidation may be carried out in one or several steps by initially precipitating $\alpha$-FeOOH seeds and subsequently growing a pigment by the addition of more iron salts or by the Penniman process. In a particularly preferred single-step process, precipitation and oxidation are carried out in the presence of zinc ions and, optionally, phosphate ions at a pH-value below about 7, oxidation is terminated on reaching a pH value of about 4 and the zinc- and, optionally, phosphate-containing $\alpha$-FeOOH obtained is treated with alkali metal phosphates, preferably pyrophosphates, for protection against sintering prior to separation from the precipitation suspension.

This process is preferably carried out by adding sinc sulphate in a quantity corresponding to about 0.3 to 3% by weight of zinc (based on FeOOH) to a solution containing about 80 to 120 g of iron sulphate per liter and adding alkali solution, which may optionally contain $NaH_2PO_4.2H_2O$ in a quantity corresponding to about 0.1 to 1.5% by weight of $P_2O_5$, to this solution in such a quantity that a degree of precipitation of about 50 to 75% of the iron(II) is obtained. The basic iron(II) salt precipitated is oxidized with intensive stirring by passing through about 2 to 8 liters of air or oxygen-enriched air per hour per liter of precipitation solution at temperatures in the range of about 40 to 80° C. until the suspension has taken on a yellow-green color. In the $\alpha$-FeOOH suspension thus obtained, iron phosphate is precipitated onto the FeOOH particles for protection against sintering by the gradual addition of an adequate quantity of phosphate solution, preferably pyrophosphate.

The $\alpha$-FeOOH particles obtained in this way have a mean crystallite size determined by X-Ray-diffractometric data of about 12 to 22 nanometers, the crystallite size of the $\alpha$-FeOOH being adjustable by suitably selecting the instant at which formation of the $\alpha$-FeOOH is terminated.

Larger $\alpha$-FeOOH particles are preferably obtained by a two-step process. In this case, the $\alpha$-FeOOH suspension obtained as described above is used as a seed suspension. A solution containing iron sulphate and zinc sulphate is added to the seed suspension and the temperature is increased to about 80° C. By slowly adding sodium hydroxide and blowing in more air, seed growth then occurs, $\alpha$-FeOOH particles having a crystallite size of about 20 to 32 nanometers, determined by X-ray-diffractometric data being obtained. Iron phosphate is then precipitated onto the particles as described above.

The coercive force of the metal powder ultimately produced is adjusted through the choice of the $\alpha$-FeOOH particle size. The single-step process is particularly suitable for the production of metal powders having coercive force above about 800 and preferably above about 1000 Oe. By contrast, the two-step process is preferably used for the production of low-coercivity metal powders having coercive forces of about 500 to 1000 Oe.

It is essential for producing the metal powders according to the invention containing individual particles with few pores that the reduction to metal should not take place in a single step. Instead, the $\alpha$-FeOOH should first be converted into ferrimagnetic iron oxide containing few pores and stabilized as such.

Various processes may be used for conversion into ferrimagnetic iron oxide containing few pores and its structural stabilization.

In one of these processes, the $\alpha$-FeOOH is dried at temperatures slightly above about 100° C. after it has been filtered off from the precipitation suspension and washed free from sulphate, followed by dehydration at temperatures in the range of about 215 to 400° C. The $\alpha$-$Fe_2O_3$ thus obtained is tempered for about 0.5 to 2 hours at temperatures in the range of about 600° to 900° C. and preferably at temperatures in the range of about 650° to 850° C. and is then reduced to $Fe_3O_4$ in a stream of moist hydrogen at temperatures of about 400° to 500° C. Stabilization is carried out by further tempering under inert conditions at temperatures of about 600° to 800° C. Tempering may be carried out under noble gases, nitrogen or carbon dioxide. A mixture of nitrogen and carbon dioxide is advantageously used. The inert gas advantageously has an oxygen content which corresponds to the oxygen partial pressure of carbon dioxide at the treatment temperature. Stabilization advantageously comprises an at least partial reoxidation to $\gamma$-$Fe_2O_3$.

Where particularly preferred Zn- and phosphate-stabilized $\alpha$-FeOOH particles are used, there is generally no need for reoxidation.

Where less preferred FeOOH-particles are used, it may be advisable for reduction to $Fe_3O_4$ to be followed by reoxidiation to $\gamma$-$Fe_2O_3$. The $\gamma$-$Fe_2O_3$ may with advantage initially be reduced back to $Fe_3O_4$ and then tempered in an inert gas. Depending on the FeOOH used, it may be necessary to repeat the reoxidation/reduction process several times. However, even where FeOOH obtained in a less preferred manner is used, two such cycles are generally sufficient.

The structurally stabilized ferrimagnetic iron oxide of low pore content thus obtained is reduced to the metal with a gaseous reducing agent, preferably dry hydrogen, at temperatures in the range of about 300° to 600° C.

In another process, the $\alpha$-FeOOH is converted into ferrimagnetic iron oxide of low pore content and structurally stabilized by hydrothermal treatment. Thereafter, the $\alpha$-FeOOH, after it has been separated from the precipitation suspension and washed free from sulphate, is heated in an autoclave to temperatures above about 100° C. preferably about 200° C. and, with particular preference, between about 250° and 500° C. in the presence of mono-, di- or tri-saccharides and hydroxides and/or carbonates of alkali metals and/or alkaline-earth metals and also in the presence of excess water. The treatment may extend over a period of about 10 minutes to 5 hours, although it preferably lasts about 2 hours.

The monosaccharides used may be arabinose, xylose, ribose, glycose, galactose, mannose or fructose. The di- or tri-saccharides used may be cane sugar, lactose, maltose and/or raffinose.

Further advantageous forms of the hydrothermal treatment may be carried out in accordance with German Offenlegungsschrift No. 2,633,597. For example, about 0.01 to 2% by weight of laminators, such as polyvinyl alcohol or lignin sulphonate, may be additionally added to the suspension in the autoclave. After the autoclave treatment, the iron oxide obtained is washed, filtered and dried and then reduced to the metal with a gaseous reducing agent at temperatures in the range of about 300° to 600° C.

The metal pigments produced by the process according to the invention are obtained in pyrophoric form. They may, of course, be subjected to a variety of after-treatments with the object of stabilization against oxidation and/or influencing their dispersion properties.

The metal pigments of low pore content are used for the production of magnetic media (such as magnetic tapes, discs, floppy discs, magnetic cards or identification systems) and as pigments for printing inks for the magnetic recording of information. For example, the incorporation of these pigments gives tapes having very favorable magnetic data (tape remanence greater than 2500 G, preferably greater than 3000 G; orientability $B_R/B_s$ greater than 0.75, preferably greater than 0.80). Magnetic tapes such as these based on the metal pigments according to the invention may be used with advantage (above all in cassettes) in the audio and video field (optionally new bias-setting) and are particularly suitable for use as master tapes for contact thermocopying processes.

The invention is illustrated by the following examples:

EXAMPLE 1

236 g of $ZnSO_4.7H_2O$ in 1 liter of water are added to 248 liters of an iron sulphate solution containing 100 g of $FeSO_4$/liter. 20 liters of a sodium hydroxide solution containing 390 g of NaOH/l are then added with stirring over a period of 10 minutes. $\alpha$-FeOOH seed formation is then carried out over a period of 6 hours at 54° C. with intensive stirring and gassing with air.

When the pH-value has fallen below 4.0, 40 liters of a solution containing 8.97 kg of $FeSO_4$ and 46.5 g of $ZnSO_4$ are added to the suspension and the temperature is increased to 80° C. Formation of the $\alpha$-FeOOH pigment then takes place over a period of 9 hours during which air is blown in and 4 liters/hour of sodium hydroxide (containing 200 g of NaOH/l) are added, the pH-value rising slowly from 3.3 to 4.2. The suspension then contains 44.9 g of FeOOH/l and 15.3 g of $FeSO_4$/l. At pH 4.2, a solution of 238 g of $Na_4P_2O_7$ in 8 liters of water is added over a period of 30 minutes during which more air is introduced. After stirring for 30 minutes, the $\alpha$-FeOOH is filtered off, washed free from sulphate and dried.

A sample of the $\alpha$-FeOOH thus obtained having a mean crystallite size of 25 mm determined by X-ray-diffractometric data is dehydrated in air and tempered for 30 minutes at 760° C. as $\alpha$-$Fe_2O_3$. This is followed by reduction with moist hydrogen for 90 minutes at 420° C. to magnetite which is subjected to final tempering for 30 minutes at 700° C. under a mixed atmosphere of nitrogen and carbon dioxide. The magnetite has the following properties:

Needles: compact, low pore content
Crystal size: 57.5 nm
$I^Hc$: 455 (Oe)
$Br/\rho$: 535 $Gg^{-1}$ cc.

Figure 1:
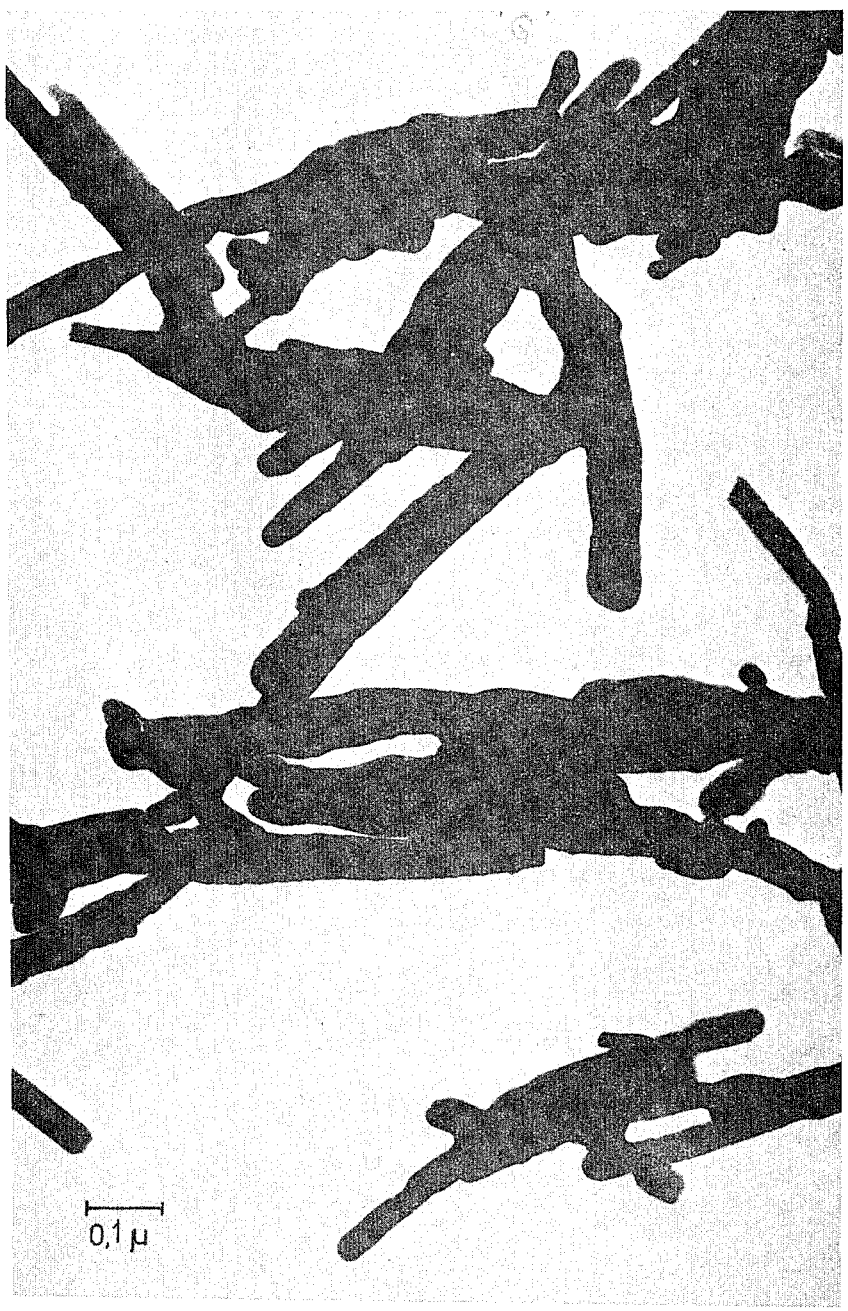
FIG. 1 shows an electron microscope photograph of metal needles according to the invention as produced in Example 1 hereinbelow.
Figure 2:
FIG. 2 shows highly porous needles according to the prior art dissociated into a plurality of individual metal cores with the same magnification as in FIG. 1.

A sample of the magnetite is reduced to the metal in a stream of hydrogen at 375° C. Based on the iron content, the product is reduced throughout and consists of compact needles of low pore content having the following magnetic powder data:

$I^HC$: 583 Oe
$Br/\rho$: 1060 $Gg^{-1}$cc
$4\pi I_s/\rho$: 1868 $Gg^{-1}$cc
$Br/4\pi I_s$: 0.57 as measured in a field of 3.5 kOe. A microphotograph of the product is shown in FIG. 1.

EXAMPLE 2

Starting with solutions corresponding to Example 1, $\alpha$:FeOOH seed formation is carried out over a period of 5 hours at 54° C. with intensive stirring and gassing with air. Following the addition of the $FeSO_4$-$ZnSO_4$-solution (as in Example 1), formation of the $\alpha$-FeOOH pigment is carried out over a period of 12.5 hours at 80° C. by the addition of 4 liters of sodium hydroxide (200 g of NaOH/l) per hour, the pH-value rising slowly from 3.0 to 3.9. The suspension then contains 54.4 g of FeOOH and 2.6 g of $FeSO_4$ per liter. Thereafter, the after-treatment with pyrophosphate and working up into $\alpha$-FeOOH follow in the same way as in Example 1.

A sample of the α-FeOOH thus obtained (crystallite size 24.5 nm) is dehydrated in air and tempered for 30 minutes at 760° C. as α-Fe$_2$O$_3$. This is followed by reduction with moist hydrogen for 90 minutes at 440° C. to form magnetite and final tempering for 30 minutes at 700° C. in an inert gas. The magnetite has the following properties:

Needles: compact, low pore content
Crystallite size: 48.5 nm
I$^H$c: 481 Oe
Br/ρ: 525 Gg$^{-1}$ cc A sample of the magnetite is reduced to the metal in a stream of hydrogen at 400° C. Based on the iron content, the product is reduced throughout and consists of compact needles of low pore content having the following magnetic powder data:

I$^H$c: 784 Oe
Br/ρ: 1186 Gg$^{-1}$ cc  4π$I_s$/ρ: 1911 Gg$^{-1}$ cc
Br/4π$I_s$: 0.62 as measured in a field of 3.5 kOe.

EXAMPLE 3

A solution of 0.256 kg of NaH$_2$PO$_4$.2H$_2$O in 2 liters of water and 30 liters of sodium hydroxide (0.35 kg of NaOH/l) is added with stirring at 55° C. to 325 liters of a solution containing 32.7 kg of FeSO$_4$ and 0.925 kg of ZnSO$_4$.7H$_2$O. The combined solutions are then gassed with a mixture of 1.4 m$^3$/h of air and 4.5 m$^3$/h of nirogen with intensive stirring until the suspension has taken on a yellow-brown color.

A solution of 21.2 g of Na$_4$P$_2$O$_7$ in 0.8 liter is added over a period of 30 minutes with stirring at 80° C. to a part of the suspension containing 1130 g of FeOOH. After stirring for 30 minutes, the product is filtered, washed free from sulphate and dried.

The α-FeOOH obtained (crystallite size 16.5 nm) is dehydrated in air and tempered for 30 minutes at 680° C. as α-Fe$_2$O$_3$. Reduction to Fe$_3$O$_4$ is then carried out with moist hydrogen over a period of 90 minutes at 420° to 450° C. After final tempering for 30 minutes at 600° to 610° C. in an inert gas atmosphere, a magnetite having the following properties is obtained:

Needles: compact, low pore content
I$^H$c: 387 Oe
Br/ρ: 367 Gg$^{-1}$ cc

A sample of this magnetite is reduced to the metal in a stream of hydrogen at 400° C. Based on the iron content, the product is reduced throughout and consists of compact needles of low pore content and having the following magnetic powder data:

I$^H$c: 1239 Oe
Br/ρ: 1154 Gg$^{-1}$ cc
4π$I_s$/ρ: 1837 Gg$^{-1}$ cc
Br/4π$I_s$: 0.63 as measured in a field of 3.5 kOe.

EXAMPLE 4

447 g of ZnSO$_4$.7H$_2$O in 2 liters of water are added to 315 liters of an iron sulphate solution containing 100 g of FeSO$_4$.7H$_2$O/l, followed shortly before precipitation by the addition of 184 g of NaH$_2$PO$_4$.2H$_2$O in 1.5 liters of water. 26.2 liters of sodium hydroxide containing 390 g of NaOH/l are then added with stirring over a period of about 10 minutes. Oxidation is then carried out with intensive stirring and gassing with a mixture of 4.5 m$^3$/h of nitrogen and 1.5 m$^3$/h of oxygen at a temperature of 52° C. until a yellow-brown color is obtained. The seed suspension thus obtained is heated with further gassing to a temperature of 80° C. and the iron which is still in solution is precipitated at that temperature by the addition of sodium hydroxide (200 g of NaOH/l). When the pH-value has fallen below 4.0, a solution of 276 g of Na$_4$P$_2$O$_7$ in 5 liters of water is added dropwise over a period of 30 minutes at 80° C. while air (6 m$^3$/h) is passed through. After stirring for 30 minutes, the α-FeOOH is filtered off, washed free from sulphate and dried.

The α-FeOOH obtained, which has a mean crystallite size of 23.5 nm, determined by X-ray-diffractometric data, is dehydrated in air and tempered for 30 minutes at 700° C. as α-Fe$_2$O$_3$. This is followed by reduction with moist hydrogen for 90 minutes at 420° C. to form magnetite which is finally tempered for 30 minutes at 760° C. under a mixed atmosphere of nitrogen and carbon dioxide. The magnetite has the following properties:

Needles: compact, low pore content
Crystallite size: 41.0 nm
I$^H$c: 474 Oe
Br/ρ: 547 Gg/$^{-1}$ cc The magnetite is reduced to the metal in a stream of hydrogen at 425° C. Based on the iron content, the product is reduced throughout and consists of compact needles of low pore content having the following magnetic powder data:

I$^H$c: 929 Oe
Br/ρ: 1170 Gg$^{-1}$ cc
4π$I_s$/ρ: 1812 Gg$^{-1}$ cc
Br/4π$I_s$: 0.65 as measured in a field of 3.5 kOe.

EXAMPLE 5

Quantities of 500 ml of an aqueous suspension containing 20 g of FeOOH are mixed with stirring at room temperature with 15 g of glucose, 18 ml of a 4.75 normal NaOH-solution and 0.025 g of polyvinyl alcohol as a laminator. The suspension is poured into a fine steel vessel which is then heated over water on a tripod in a 5-liter autoclave and kept for 2 hours at a temperature of 290° C. After cooling, the iron oxide suspension obtained is washed and filtered. The filter residue is redispersed and phosphated with Na$_2$P$_2$O$_7$ (corresponding to 1% by weight of P$_2$O$_5$, based on Fe$_3$O$_4$). The magnetite obtained after filtration and drying has the following properties:

Needles: compact, low pore content
Crystallite size: 43.5 nm
I$^H$C: 375 Oe
Br/ρ: 456 Gg$^{-1}$ cc The magnetite is reduced to the metal in a stream of hydrogen at 375° C. Based on the iron content, the product is reduced throughout and consists of compact needles of low pore content having the following magnetic powder data:

I$^H$c: 795 Oe
Br/ρ: 1123 Gg$^{-1}$cc
4π$I_s$/ρ: 2005 Gg$^{-1}$ cc
Br/4π$I_s$: 0.56 as measured in a field of 3.5 kOe.

It will be appreciated that the instant specification and examples are set forth by way of illustration and not limitation, and that various modifications and changes may be made without departing from the spirit and scope of the present invention.

What is claimed is:

1. A metal powder, suitable for magnetic recording, consisting essentially of iron, the individual particles being acicular and containing on average no more than 5 pores and consisting on average of no more than 2 metal cores.

2. A metal powder as claimed in claim 1, in which the individual particles contain on average no more than 1 pore and consist on average of no more than 1 metal core.

3. A metal powder as claimed in claim 1, containing about 0.1 to 7% by weight of at least one of cadmium, lead, calcium, zinc, magnesium, aluminum, chromium, tungsten, phosphorus (expressed as $P_2O_5$) and/or boron (expressed as $B_2O_3$).

4. A metal powder as claimed in claim 1, containing about 0.1 to 4% by weight of phosphorus (expressed as $P_2O_5$) and about 0.1 to 4% by weight of zinc.

5. A metal powder as claimed in claim 1, having a squareness ratio $Br/4\pi I_s$ of greater than about 0.55, preferably greater than 0.6, for a field of 3500 Oe.

6. In the production of a metal powder according to claim 1, wherein an aqueous iron-(II)-salt solution is precipitated and oxidized to produce finely divided acicular iron-(III)-oxide-hydroxide, the iron-(III)-oxide-hydroxide is dehydrated and then reduced to the metal, the improvement which comprises tempering the dehydrated iron-(III)-oxide-hydroxide in an inert gas at a temperature of about 600° to 900° C. to form ferromagnetic iron oxide of low pore content, subsequently reducing it to $Fe_3O_4$ with moist hydrogen at about 300° to 600° C., stabilizing the low pore iron oxide by tempering at about 600° to 800° C., and reducing it to the metal with a gaseous reducing agent at a temperature from about 300° to 600° C.

7. A process as claimed in claim 6, wherein precipitation and oxidation to form the iron-(III)-oxide hydroxide are carried out at a pH-value below about 7, oxidation is terminated on reaching a pH-value lower than about 4 and the FeOOH obtained is protected against sintering by chemical stabilization prior to dehydration.

8. A process as claimed in claim 6, wherein to the suspension of iron-(III)-oxide-hydroxide precipitate at least one soluble compound of at least one of the elements cadmium, lead, calcium, magnesium, zinc, aluminum, chromium, tungsten, and/or an oxygen compound of phosphorus or boron is added for stabilizing the FeOOH against sintering.

9. A process as claimed in claim 8, wherein the stabilizing substances are added to the precipitation suspension before termination of the precipitation and oxidation reaction.

10. A process as claimed in claim 8, wherein a water-soluble phosphorus-oxygen compound is used for chemical stabilization.

11. A process as claimed in claim 8, wherein a zinc compound and a phosphorus-oxygen compound are used for chemical stabilization.

12. A process as claimed in claim 6, wherein the α-FeOOH has a mean particle size of about 12 to 32 nm, determined from X-ray-diffractometric data.

13. A process as claimed in claim 6, wherein the stabilization as ferromagnetic oxide includes at least partial reoxidation to $\gamma$-$Fe_2O_3$.

* * * * *